(12) United States Patent
Zhao et al.

(10) Patent No.: US 7,473,728 B2
(45) Date of Patent: Jan. 6, 2009

(54) DUAL PHASE RUBBER COMPOSITION AND TIRE WITH NANOCOMPOSITE-CONTAINING SIDEWALL THEREOF

(75) Inventors: Junling Zhao, Hudson, OH (US); Michael Julian Crawford, Akron, OH (US); Aaron Scott Puhala, Kent, OH (US); Martin Paul Cohen, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 683 days.

(21) Appl. No.: 11/014,017

(22) Filed: Dec. 16, 2004

(65) Prior Publication Data

US 2006/0135671 A1    Jun. 22, 2006

(51) Int. Cl.
*C08K 9/04* (2006.01)

(52) U.S. Cl. .................. 524/445; 524/497; 524/492; 524/495

(58) Field of Classification Search ............. 524/445, 524/497, 492, 495
See application file for complete search history.

(56) References Cited

U.S. PATENT DOCUMENTS

| | | | |
|---|---|---|---|
| 4,431,755 A | 2/1984 | Weber et al. | 523/203 |
| 4,528,235 A | 7/1985 | Sacks et al. | 428/220 |
| 4,536,425 A | 8/1985 | Hekai | 428/35 |
| 4,857,397 A | 8/1989 | Mowdood et al. | 428/323 |
| 4,911,218 A | 3/1990 | Patitsas | 152/525 |
| 4,960,639 A | 10/1990 | Oda et al. | 428/34.5 |
| 4,983,432 A | 1/1991 | Bissot | 428/35.7 |
| 5,049,609 A | 9/1991 | Patitsas | 524/386 |
| 5,091,432 A | 2/1992 | Glasky | 514/262 |
| 5,178,702 A | 1/1993 | Ferking, Jr. et al. | 152/510 |
| 5,552,469 A | 9/1996 | Beall et al. | 524/445 |
| 5,576,372 A | 11/1996 | Kresge et al. | 524/442 |
| 5,576,373 A | 11/1996 | Kresge et al. | |
| 5,840,796 A | 11/1998 | Badesha et al. | 524/449 |
| 5,857,397 A | 1/1999 | Matsubayashi et al. | 83/556 |
| 5,936,023 A | 8/1999 | Kato et al. | 524/445 |
| 6,034,164 A | 3/2000 | Elspass et al. | 524/445 |
| 6,060,549 A | 5/2000 | Li et al. | 524/445 |
| 6,087,016 A | 7/2000 | Feeney et al. | 528/454 |
| 6,232,389 B1 | 5/2001 | Feeney et al. | 524/450 |

*Primary Examiner*—Robert D. Harlan
(74) *Attorney, Agent, or Firm*—Henry C. Young, Jr.

(57) ABSTRACT

This invention relates to a dual phase rubber composition and pneumatic tire with a rubber sidewall thereof, namely a dual phased non-black colored rubber composition composed of a first pre-formed elastomer phase comprised of butyl-type rubber and EPDM rubber containing a dispersion therein of reinforcing filler comprised of a particulate amorphous precipitated silica and a second pre-formed elastomer phase comprised of a nanocomposite of natural rubber containing a dispersion therein of exfoliated clay platelets. Said exfoliated clay platelets may be substantially oriented within the tire sidewall in a parallel direction to each and may also be substantially oriented in an annular direction about the axis of the tire. The tire sidewall rubber composition may contain at least one additional elastomer which may be included in either or both of said elastomer phases. Such tire sidewall rubber composition may contain a non-black colorant pigment, such as for example a white colored titanium dioxide pigment. The dual phased tire sidewall rubber composition is prepared by a phase mixing process comprised of pre-blending said butyl-type rubber and EPDM rubber together with said precipitated silica reinforcing filler to form a pre-mix thereof, and thereafter mixing therewith said nanocomposite as a pre-formed blend of natural rubber and exfoliated clay platelets.

18 Claims, No Drawings

DUAL PHASE RUBBER COMPOSITION AND TIRE WITH NANOCOMPOSITE-CONTAINING SIDEWALL THEREOF

FIELD OF THE INVENTION

This invention relates to a dual phase rubber composition and pneumatic tire with a rubber sidewall thereof, namely a dual phased non-black colored rubber composition composed of a first pre-formed elastomer phase comprised of butyl-type rubber and EPDM rubber containing a dispersion therein of reinforcing filler comprised of a particulate amorphous precipitated silica and a second pre-formed elastomer phase comprised of a nanocomposite of natural rubber containing a dispersion therein of exfoliated clay platelets. Said exfoliated clay platelets may be substantially oriented within the tire sidewall in a parallel direction to each and may also be substantially oriented in an annular direction about the axis of the tire. The tire sidewall rubber composition may contain at least one additional elastomer which may be included in either or both of said elastomer phases. Such tire sidewall rubber composition may contain a non-black colorant pigment, such as for example a white colored titanium dioxide pigment. The dual phased tire sidewall rubber composition is prepared by a phase mixing process comprised of pre-blending said butyl-type rubber and EPDM rubber together with said precipitated silica reinforcing filler to form a pre-mix thereof, and thereafter mixing therewith said nanocomposite as a pre-formed blend of natural rubber and exfoliated clay platelets.

BACKGROUND OF THE INVENTION

Pneumatic rubber tires are composed of a plurality of components which conventionally include sidewalls which are subject to considerable flexing and scuffing during use of the tire, a phenomenon well known to those having skill in such art.

Sometimes a portion of such sidewalls are of a decorative white color in which a white colored titanium dioxide pigment is used to the exclusion of black colored carbon black reinforcing filler.

Sidewalls of pneumatic rubber tires may age somewhat prematurely as a result of one or more of weathering due to atmospheric conditions, fatigue cracking due to extensive flexing under operating conditions and abrasion due to scuffing.

Rubber tire sidewall aging due to weathering may be, for example, a result of exposure to one or more of ultraviolet light, ozone and high humidity. Antidegradants are conventionally mixed with the sidewall rubber to counteract such effects. Also, sometimes low unsaturation elastomers such as butyl rubber and EPDM's are included in the sidewall rubber composition to counteract such effects.

Rubber tire sidewall fatigue cracking is usually due to extensive flexing of the tire sidewall as the tire is run under load under service conditions. Such fatigue cracking may first initiate (crack initiation) and then propagate (crack propagation) over time. Oftentimes a cis 1,4-polyisoprene rubber is included in the tire sidewall rubber composition to counteract such effects.

It is important to appreciate that natural cis 1,4-polyisoprene rubber is susceptible to ozone attack and consequential damage such as visible surface cracking. Accordingly, amine-containing antiozonants are used in carbon black-containing, and therefore black-colored, tire sidewall rubber compositions which contain natural rubber, a practice well known to those having skill in such art.

Such amine-containing antiozonants are sometimes referred to as "staining antiozonants" because they tend to cause a discoloration of the tire sidewall rubber composition. Such discoloration is not particularly readily noticeable for carbon black-containing, black colored tire rubber sidewall composition, a phenomenon known to those having skill in such art.

However, in practice, for non-black colored tire sidewall rubber compositions, such staining antiozonants are not desired since they, in turn, conventionally promote a visible, unwanted discoloration of the non-black colored (e.g. white colored with titanium dioxide coloring pigment) tire sidewall rubber composition. Instead, phenol-based antiozonants are conventionally used for such non-black colored (e.g. white colored), natural rubber-containing tire sidewall rubber composition. However, phenol-based antiozonants are conventionally not as effective as amine-containing antiozonants for protecting the natural rubber from ozone attack as it is understood would be well known to those having skill in such art.

Therefore, there exists a need to create an ozone-resistant, non-discoloring tire sidewall rubber composition, particularly of a non-black colored (e.g. white colored with titanium dioxide pigment colorant) which does not contain amine-containing chemical antiozonants but which do contain the natural rubber.

Nanocomposites, as referenced herein, refer to composites comprised of at least one elastomer, particularly natural cis 1,4-polyisoprene rubber, which contains a dispersion of exfoliated clay platelets therein.

Historically, dispersions of exfoliated platelets of selective clays have heretofore been suggested for various thermoplastic and rubber compositions for use in various articles. For example, see U.S. Pat. Nos. 4,431,755, 5,840,796 as well as U.S. Pat. Nos. 6,087,016 and 6,232,389 and background U.S. Pat. Nos. 4,528,235, 4,536,425, 4,857,397, 4,911,218, 4,960,639, 4,983,432, 5,091,432, 5,049,609, 5,178,702 5,552,469, 5,576,372, 5,576,373 and 5,857,397.

Historically, exfoliated clay particles are formed by exfoliation of intercalated water swellable clay. Such intercalated clay may be prepared by, for example (A) obtaining a clay which is comprised of a plurality of stacked layers, or platelets which is swellable upon its dispersion in water (e.g. smectite clay such as, for example, montmorillonite and hectorite clays as well as vermiculate clay), (B) intercalating the clay by, for example, dispersing the clay in an aqueous solution containing a quaternary ammonium salt which causes the clay to swell by an ion exchange between the quaternary ammonium salt and ions within the galleries between the stacked platelets of the clay in a manner that the average spacing between the platelets expands from, for example about 10 Angstroms, to an average spacing in a range of, for example, about 20 to about 40 Angstroms, depending somewhat upon the quaternary ammonium salt used and the particular clay, followed by (C) drying the treated, or intercalated, clay.

The intercalated clay may be exfoliated in a sense of at least a portion of individual platelets becoming separated from the intercalated clay itself to form exfoliated clay platelets. Therefore, such clay particles are usually in a form of exfoliated intercalated clay platelets of which a portion of the intercalated clay is in a from of exfoliated clay platelets (e.g. intercalated clay of which at least a portion has been exfoliated into exfoliated clay platelets).

A nanocomposite comprised of at least one elastomer and dispersion of exfoliated intercalated clay platelets may be thereby formed in which the clay itself is in a form of an intercalated clay which is at least partially exfoliated.

In one aspect, it may be desired that the exfoliated clay platelets, as well as the accompanying intercalated clay (intercalated, water swellable clay which accompanies clay platelets exfoliated from the intercalated clay, all contained as a dispersion in the elastomer composition), exhibit a significant coupling to the elastomer composition.

Such coupling the elastomer(s) of the elastomer composition rubber may be achieved, for example, by use of a rubber reactive quaternary ammonium salt that tends to couple the rubber reactive moiety of the exfoliated platelets and intercalated clay to the elastomer(s), particularly to diene-based elastomers.

Various water swellable clays composed of a stacked layers, or platelets, with galleries therebetween which contain the ion-exchangeable ions (e.g. cations comprised of one or more of sodium, potassium, lithium, magnesium, calcium, primarily sodium) are, for example, smectite clays such as for example montmorillonite and hectorite clays as well as vermiculite clay.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated. The terms "compound" and "rubber composition" may be used interchangeably unless indicated. The term "carbon black" is used to refer to rubber reinforcing carbon blacks unless otherwise indicated. Exemplary rubber reinforcing carbon blacks may be referred to, for example, in *The Vanderbilt Rubber Handbook* (1987) on Pages 414 through 417.

The term "butyl-type" rubber as used herein refers to relatively unsaturated elastomeric copolymers of isobutylene such as, for examples, copolymers of isobutylene and a minor amount (e.g. from 0.5 to 3 percent) of a conjugated diene (e.g. isoprene) which are conventionally referred to as being a "butyl" rubber, halogenated (e.g. bromine or chlorine halogenated) butyl rubber which is conventionally referred to as being a "halobutyl", "bromobutyl" or "chlorobutyl" rubber, as the case may be, and brominated copolymers of isobutylene and para-methylstyrene.

The term "EPDM" rubber, as used herein, refers to elastomeric copolymers of ethylene/propylene containing a minor amount (e.g. from about 2 to about 15 weight percent) of units derived from a non-conjugated diene such as, for example, ethylidene norbornene, 1,4-hexadiene and dicyclopentadiene, with an ethylene/propylene ratio in a range of from about 40/60 to about 80/20.

DISCLOSURE AND PRACTICE OF INVENTION

In accordance with this invention, dual phase rubber composition and a pneumatic tire having an outer visible rubber sidewall thereof is provided, particularly a pneumatic tire is provided having an outer visible rubber sidewall of which at least a portion of said sidewall is a dual phased, non-black colored rubber composition, (therefore preferably exclusive of carbon black) comprised of a blend of a first elastomer phase and a second elastomer phase;

wherein said dual phase rubber composition and said tire sidewall rubber composition is comprised of, based on parts by weight per 100 parts by weight rubber (phr):

(A) 100 phr of elastomers comprised of:
(1) about 40 to about 90, alternately from about 40 to about 80, phr of a butyl-type rubber comprised of at least one of:
 (a) butyl rubber comprised of a copolymer of isobutylene and about 0.5 to about 3 mole percent of conjugated diene comprised of isoprene,
 (b) halogenated butyl rubber selected from chlorobutyl and bromobutyl rubber,
 (c) brominated copolymer of isobutylene and para-methylstyrene,
(2) from zero to about 30, alternately from about 5 to about 30, phr of EPDM rubber, and
(3) about 5 to about 50, alternately from about 10 to about 50, phr of natural cis 1,4-polyisoprene rubber,
(B) about 5 to about 30 phr of precipitated silica (reinforcing filler);
(C) partially exfoliated intercalated clay platelets as a dispersion in an amount of from about 5 to about 25 weight percent of a dispersion thereof in said natural cis 1,4-polyisoprene rubber (e.g. said natural cis 1,4-polyisoprene rubber contains a dispersion therein of from about 5 to about 25 weight percent of said partially exfoliated intercalated clay platelets), and
(D) a non-black colored pigment colorant, preferably comprised of titanium dioxide;

wherein said first elastomer phase is comprised of a pre-blend of said butyl-type rubber(s), said optional EPDM rubber and said precipitated silica;

wherein said second elastomer phase is a nanocomposite comprised of a pre-blend of said natural cis 1,4-polyisoprene rubber and said partially exfoliated intercalated clay platelets.

In further accordance with this invention, said dual phase rubber composition and said rubber composition for said tire sidewall is prepared by blending pre-blended elastomer compositions comprised of, based upon parts per 100 parts of the total amount of rubber in said dual phase rubber composition (phr):

(A) a first elastomer pre-blend comprised of:
(1) elastomers comprised of:
 (a) about 40 to about 90, alternately from about 40 to about 80, phr of a butyl-type rubber comprised of at least one of:
  (i) butyl rubber comprised of a copolymer of isobutylene and about 0.5 to about 3 mole percent of conjugated diene comprised of isoprene,
  (ii) halogenated butyl rubber selected from chlorobutyl and bromobutyl rubber,
  (iii) brominated copolymer of isobutylene and para-methylstyrene, and
 (b) from zero to about 30, alternately from about 5 to about 30, phr of EPDM rubber, and
(2) about 5 to about 30 phr of precipitated silica reinforcing filler, with
(B) a second elastomer pre-blend as a nanocomposite comprised of:
(1) about 5 to about 50, alternately from about 10 to about 50, phr of cis 1,4-polyisoprene rubber containing a dispersion therein comprised of:
(2) partially exfoliated intercalated clay platelets in an amount of about 5 to about 25 weight percent of a dispersion thereof in said natural cis 1,4-polyisoprene rubber, to form said dual phased rubber composition comprised of a first phase comprised of said first elastomer pre-blend and a second phase comprised of said second elastomer pre-blend, wherein at least one of said elastomer phases contains a non-black colored pigment colorant.

A significant aspect of the non-black colored tire sidewall rubber composition is its elastomer composition comprised of a blend of dual elastomeric phases in which the pre-formed natural rubber nanocomposite, with its partially exfoliated intercalated clay dispersion, is presented as one elastomeric phase and the pre-formed butyl-type rubber composition, which may contain, and preferably does contain, an EPDM rubber, with its precipitated silica reinforcement, is presented as another elastomeric phase as a result of the phase mixing process of preparing the sidewall rubber composition in which the pre-formed natural rubber-based nanocomposite is blended with the pre-formed butyl-type rubber/precipitated silica composition.

This is considered herein to be significant because the presence of the dispersion of the exfoliated clay platelets contained in the natural rubber based nanocomposite phase is envisioned herein to promote beneficial physical properties such as, for example, modulus and hardness (e.g. stiffness, toughness and strength) for the tire sidewall rubber composition.

This is also considered herein to be significant because it is envisioned that the layers of exfoliated clay platelets contained in the natural rubber based nanocomposite phase creates a plurality of physical obstacles (the platelets themselves) to penetration of ozone from the atmosphere into and through the dual phase rubber composition of the tire sidewall component.

In further accordance with this invention, said tire sidewall rubber composition is provided wherein said exfoliated clay platelets are substantially oriented in a parallel relationship to each other which is considered herein to magnify such physical obstacle effect of the presence of the exfoliated clay platelets in the natural rubber based nanocomposite phase of the tire sidewall rubber composition.

Such orientation of the exfoliated clay platelets is physically caused by the flow of the dual phased rubber composition, which contains the exfoliated clay platelets, during the processing of the rubber composition (e.g. shaping by milling and/or extrusion of the rubber composition under relatively high shear conditions form an uncured tire sidewall precursor strip which is subsequently built into a tire assembly and the resulting tire assembly cured in a suitable mold under conditions of elevated temperature (e.g. from about 140° C. to about 180° C.) and elevated pressure to form a cured rubber tire with the outer sidewall comprised of said dual rubber phases.

In such tire sidewall, it is envisioned that the exfoliated clay platelets are substantially oriented both in a parallel relationship to each other and in an annular direction (substantially in a somewhat circular direction about the axis of the tire itself) in the tire sidewall rubber composition.

Such orientation of the exfoliated clay platelets in the nanocomposite elastomeric phase is envisioned herein to promote the aforesaid important physical barrier properties to ozone degradation resistance to the visible, atmospherically exposed, non-black colored sidewall rubber composition as well as stain resistance (resistance to discoloration of the non-black colored sidewall rubber composition) when is in a normal contact with one or more tire components comprised of a carbon black-reinforced rubber composition which contains an amine-based antidegradant.

Representative of various additional conjugated diene-based elastomers for the tire sidewall rubber composition of this invention are polymers of at least one of isoprene and 1,3-butadiene and copolymers of styrene and at least one of isoprene and 1,3-butadiene.

Such conjugated diene based elastomers may be comprised of, for example, cis 1,4-polyisoprene (natural and synthetic), cis 1,4-polybutadiene rubber, styrene/butadiene copolymer rubber, isoprene/butadiene rubber, styrene/isoprene/butadiene terpolymer rubber and high vinyl polybutadiene rubber having a vinyl 1,2-content in a range of from about 35 percent to about 90 percent.

It should readily be understood by one having skill in the art that the non-black colored tire sidewall rubber composition can be compounded by methods generally known in the rubber compounding art, such as mixing the various sulfur-vulcanizable constituent rubbers with various commonly-used additive materials such as, for example, curing aids, such as sulfur, activators, retarders and accelerators, processing additives, such as oils, resins including tackifying resins and plasticizers, fillers, pigments, stearic acid, zinc oxide, waxes, antioxidants and antiozonants (e.g. non-staining antioxidants and antiozonants), peptizing agents and non-black colored colorants, particularly comprised of, or containing, titanium dioxide pigment. As known to those skilled in the art, depending on the intended use of the sulfur-vulcanizable and sulfur-vulcanized materials (rubbers), the certain additives mentioned above are selected and commonly used in conventional amounts.

Such pneumatic tires are conventionally comprised of a generally toroidal-shaped carcass with an outer circumferential tread, adapted to be ground contacting, spaced beads and the aforesaid sidewall(s) extending radially from and connecting said tread to said beads.

Various phenol-containing antidegradants may be used in various amounts such as example, a range of from 1 to about 5 phr. Representative of such antidegradants may be, for example, polymeric hindered phenol antioxidants, and others, such as those included in The Vanderbilt Rubber Handbook (1978), within pages 344-347. As previously discussed, the phenol-containing, non-staining antioxidants are preferred where they have a significantly reduced ability to discolor the non-black colored sidewall rubber composition. Various waxes, particularly microcrystalline waxes, may be of the type shown in *The Vanderbilt Rubber Handbook* (1978), within Pages 346 and 347. Typical amounts of antiozonants may be, for example, from 1 to about 5 phr. Typical amounts of stearic acid (usually in a form of an industrial fatty acid composition which contains stearic acid, palmitic acid and oleaic acid) may be, for example, from 1 to about 3 phr. Typical amounts of zinc oxide may be, for example, from 2 to about 5 phr. Typical amounts of waxes may be, for example, from 1 to about 5 phr. Typical amounts of peptizers, if used, may be, for example, from 0.1 to about 1 phr. The presence and relative amounts of the above additives are not considered herein as an aspect of the present invention unless otherwise indicated.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents may be used in an amount ranging, for example, from about 0.5 to about 8 phr with a range of from about 1.5 to about 2.25 sometimes being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging, for example, from about 0.5 to about 2 phr. In another embodiment, combinations of two or more accelerators in which a primary accelerator is generally used in the larger amount (for example 0.5 to 1 phr), and a secondary accelerator which is generally used in smaller amounts (for example 0.05 to 0.50 phr) in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include, for example, amines, disulfides, guanidines, thioureas, thiazoles, thiurams, sulfenamides, dithiocarbamates and xanthates. Usually, amine-based accelerators are not desired because they are more vulnerable to discoloration of the non-black colored tire sidewall rubber composition. The primary accelerator may preferably be a sulfenamide. If a second accelerator is used, the secondary accelerator may be a guanidine, dithiocarbamate or thiuram compound, particularly diphenyl guanidine.

Non-black colored colorants (e.g. non-black colored pigments) which may be, for example, or be comprised of, titanium dioxide pigment which may be used in an amount of, for example, about 1 to about 40 phr.

The tire can be built, shaped, molded and cured by various methods which will be readily apparent to those having skill in the art.

The practice of this invention is further illustrated by reference to the following examples which are intended to be representative rather than restrictive of the scope of the invention. Unless otherwise indicated, all parts and percentages are by weight.

EXAMPLE I

A dual phased white colored rubber compositions were prepared by a phase mixing process and identified herein as Comparative Sample A and Experimental Sample B.

The Comparative Sample A was a blend of natural rubber, chlorobutyl rubber and EPDM which contained precipitated silica and titanium dioxide white pigment colorant.

The Experimental Sample B was a dual phased rubber composition composed of blend of a pre-formed first phase comprised of pre-mixed chlorobutyl rubber, EPDM rubber and dispersion therein of precipitated silica, with which a pre-formed second rubber phase was blended with said pre-formed first phase to form the dual phased blend, wherein said pre-formed second phase was comprised of a pre-mixed composite of natural rubber and dispersion therein of partially exfoliated intercalated clay platelets. It is considered that said individually pre-formed first and second rubber phases substantially retained their individual phase identities within the resulting rubber composition.

For Experimental Sample B, the first elastomeric phase was prepared by pre-blending chlorobutyl and EPDM rubbers together with particulate precipitated silica. With the first pre-blended elastomer phase was blended a second elastomeric phase as a pre-formed nanocomposite of natural cis 1,4-polyisoprene rubber which contained a dispersion of partially exfoliated intercalated clay platelets.

In particular, the respective ingredients were mixed in an internal rubber mixer as a first non-productive mixing step (NP1) to form the first elastomeric phase, to the exclusion of the said natural rubber based nanocomposite, sulfur and vulcanization accelerator, for about 4.5 minutes to a temperature of about 160° C., dumped from the mixer, sheeted out from an open roll mill and allowed to cool below 40° C.

The resulting composition was then mixed in an internal rubber mixer as a second, sequential, non-productive mixing step (NP2) to form a blend of said first elastomeric phase and a second elastomeric phase comprised of the said natural rubber based nanocomposite for about 4.5 minutes to a temperature of about 143° C., dumped from the mixer, sheeted out from an open roll mill and allowed to cool to a temperature below 40° C.

The resulting dual phase rubber composition was then mixed in an internal rubber mixer as a productive mixing step (P) in which sulfur and vulcanization accelerator(s) were added for a period of about 2.5 minutes to a temperature of about 110° C.

The preparation of rubber mixtures by use of sequential combination of non-productive and productive mixing steps, in general, is well known to those having skill in such art.

The Comparative Sample A and Experimental Sample B are shown in the following Table 1.

It can readily be seen that both the Comparative Sample A and Experimental Sample B contain the same types and relative amounts of ingredients including elastomers, precipitated silica and titanium dioxide white-colored colorant pigment except the Experimental Sample B contained the natural rubber based nanocomposite with its montmorillonite exfoliated clay platelet dispersion.

TABLE 1

| | Comparative Sample A | Experimental Sample B |
|---|---|---|
| First Non-Productive Mixing Step (NP1) | | |
| Natural cis 1,4-polyisoprene rubber (SMR5) | 35 | 0 |
| Chorobutyl rubber[1] | 50 | 50 |
| EPDM rubber[2] | 15 | 15 |
| Precipitated silica[3] | 20 | 20 |
| Titanium dioxide pigment colorant | 30.2 | 0 |
| Plasticizer[4] | 5 | 5 |
| Wax[5] | 3 | 3 |
| Second Non-Productive Mixing Step (NP2) | | |
| Nanocomposite (35 phr natural rubber)[6] | 0 | 40.23 |
| Titanium dioxide pigment colorant | 0 | 30.2 |
| Fatty acid[7] | 1 | 1 |
| Antidegradant[8] | 1 | 1 |
| Zinc oxide | 15 | 0 |
| Productive Mixing Step (P) | | |
| Sulfur | 1.2 | 1.2 |
| Zinc oxide | 0 | 15 |
| Accelerator(s)[9] | 2.5 | 2.5 |

[1]Chlorobutyl rubber as Chlorobutyl 1066 ™ from the Exxon Mobil Company as a chlorinated copolymer of isobutylene and a minor amount of isoprene
[2]EPDM rubber as Royalene 505 ™ from the Uniroyal Chemical Company as a terpolymer of ethylene, propylene (60/40 ratio) and about 8 weight percent of ethylidene norbornene. The EPDM reportedly had a Mooney viscosity (ML1 + 4) at 125° C. of about 55
[3]Precipitated silica as HiSil210 ™ from PPG Industries.
[4]Plasticizer as LIR-50 ™ from the Kuraray Company as a liquid polyisoprene, with a 96 percent cis 1,4-content and an average molecular weight (weight average) of about 47,000
[5]Refined paraffin was as Shellwax 100 ™ from the Shell Chemicals Company
[6]Nanocomposite of 100 parts by weight cis 1,4-polyisoprene rubber containing a dispersion of about 15 parts by weight intercalated montmorillonite clay platelets, of which a portion had been exfoliated to form exfoliated clay platelets, from The Goodyear Tire and Rubber Company
[7]An industrial stearic acid composed primarily of stearic acid typically also containing palmitic acid and oleaic acids.
[8]Antidegradant of the phenol based type
[9]Sulfenamide and diphenyl guanidine sulfur cure accelerators Various properties of Control Sample A and Sample B are reported in the following Table 2. Vulcanized Samples were cured at about 170° C. for about 12 minutes.

TABLE 2

|  | Single Phase Comparative Sample A | Dual Phase Experimental Sample B |
| --- | --- | --- |
| Natural rubber | 35 | 0 |
| Natural rubber nanocomposite | 0 | 40.23 |
| Chlorobutyl rubber | 50 | 50 |
| EPDM rubber | 15 | 15 |
| Moving Die Rheometer (MDR), 170° C.[1] | | |
| Maximum torque (dNm) | 8.17 | 10.1 |
| Minimum torque (dNm) | 1.52 | 2.86 |
| T90 (minutes) | 9.15 | 7.47 |
| Stress-strain (Instron tester) (cured 12 min. at 170° C.)[2] | | |
| Tensile strength (MPa) | 14.7 | 11.88 |
| Elongation at break (%) | 799 | 607 |
| 100% modulus, ring (MPa) | 0.94 | 1.44 |
| 300% modulus, ring (MPa) | 2.63 | 4.78 |
| Hardness, Shore A, 23° C. | 48 | 56 |
| Rebound, 23° C. | 35 | 35 |
| Rebound, 100° C. | 63 | 62 |
| RPA (191° C. cure cycle, 1 Hz, 100° C.)[3] | | |
| G' at 1% strain, (MPa) | 0.696 | 1.02 |
| G' at 10% strain, (MPa) | 0.620 | 0.832 |
| Tan delta at 10% strain | 0.112 | 0.135 |
| Dynamic Ozone Test (0 to 60% strain for 48 hrs at 50 pphm and 40° C.[4] | | |
| Specimen appearance after 48 hours | broken | good |
| Specimen surface appearance after 48 hours | edge cracks | no cracks |
| Taber abrasion test[5] | | |
| Weight loss after 1000 cycles (gm) | 1.12 | 0.86 |
| Cyclic (Dynamic) Fatigue Test (maximum cycles = 100,000 at 23° C.)[6] | | |
| Average cycles for 6 specimen samples (*two specimen samples were intact after the 100,000 cycle maximum) | 654,719 | 747,268* |
| Tear Strength (Adhesion to Self) (cured 22 min. at 170° C.)[7] | | |
| Steady state average load (N) at 23° C. | 91.1 | 93.5 |
| Steady state average load (N) at −10° C. | 85.9 | 77.3 |

[1] Data obtained according to Moving Die Rheometer instrument, model MDR-2000 by Alpha Technologies, used for determining cure characteristics of elastomeric materials, such as for example Torque and T90.
[2] Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3] Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, Apr. 26 and May 10, 1993.
[4] ASTM Test D3395
[5] ASTM Test D4060
[6] ASTM Test D4482
[7] Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument. The area of contact at the interface between the rubber samples is facilitated by placement of a plastic film (e.g. Mylar ™ film) between the samples with a cut-out window in the film to enable the two rubber samples to contact each other following which the samples are vulcanized together and the resultant composite of the two rubber compositions used for the peel strength (tear strength) test. For example, an uncured rubber sample is prepared by milling the rubber composition and applying a suitable removable film (e.g. a polyethylene film) to each of the two sides of the milled rubber. Two uncured rubber samples are cut from the milled rubber composition into a size 150 × 150 × 2.4 mm thickness. The polyethylene film is removed from one side of a first sample and a fabric backing (e.g. polyester cord fabric) is stitched to that side with a roller in order to provide dimensional stability for the rubber sample. The polyethylene film is removed from the other side of the first sample and a separator sheet of the Mylar film (with a 5 mm wide × 50 mm long cut out window) is placed and centered on the exposed rubber surface of the sample. The polyethylene film is removed from one side of the second sample. The first and second samples are pressed together with the Mylar film therebetween and stitched together with a roller in a manner that the window in the Mylar film allows the samples to contact each other. The composite of the two samples is placed in the bottom cavity of a preheated diaphragm based curing mold. The composite is covered with a sheet of cellophane film. An expandable bladder is positioned onto the cellophane film within the mold and a metal top cover is positioned over the curing bladder to form an assembly thereof, all within the mold. The mold which contains the assembly is placed in a preheated curing press. The press is closed over the mold and an air pressure of 6.9 bar (100 psi) is applied to the expandable bladder with the curing mold through an air line fixture on the curing mold. A cure temperature of 150° C. is used. After curing for about 32 minutes, the air line to the mold is shut off, the mold removed from the press, followed by removal of the top plate.

From the dynamic ozone test results reported in Table 2 it can be seen that ozone degradation of the surface of Sample B, which contained the natural rubber based nanocomposite with its dispersion of exfoliated clay platelets, was significantly reduced as compared to the natural rubber containing (without the nanocomposite) Comparative Sample A. The dynamic ozone test (ASTM D3395) relates to measuring of resistance of a vulcanized rubber sample (specimen) to surface cracking when exposed to an ozone-containing atmosphere.

In particular, the surface of the specimen of Comparative Sample A vulcanized composition was visually observed, in Table 2, to be broken during the dynamic ozone test (at 60 percent strain) at 50 pphm ozone concentration (40° C.) and also to contain edge cracks. In contrast, the surface of the specimen of Sample B vulcanized composition was visually observed to not contain surface cracks and to not be broken even after 48 hours of the dynamic ozone test.

As hereinbefore discussed, it is recognized that a natural rubber-containing non-black colored (e.g. white colored by not containing carbon black and containing titanium dioxide white colored pigment) outer exposed tire sidewall surface desirably needs to be protected from degradation due to atmospheric ozone exposure and particularly to outdoor weathering. Such need of protection is particularly evident where a vehicle, with its associated tires, remains outdoors in a normal ozone-containing atmosphere for an extended period of time.

As hereinbefore discussed, such natural rubber-containing non-black colored outer exposed tire sidewall surface, which contains a non-staining phenol-containing antidegradant, instead of a staining amine-containing antidegradant, desirably needs an aid to atmospheric degradation because of the comparatively less effective antidegradant activity of the phenol-containing antidegradant.

Accordingly, it is seen in Table 2 that the added resistance of ozone degradation of Sample B with its inclusion of the exfoliated clay platelet-containing natural rubber based nanocomposite phase is of a particularly significant benefit.

From Table 2 it can also be seen that, for the dynamic cyclic fatigue test for Sample B, the average cycles to failure was significantly greater than the average cycles to failure for Comparative Sample A even though the rubber composition for the Comparative Sample A was softer in the sense of having a lower Shore A hardness property. This was unexpected since it is otherwise ordinarily considered that, for comparable rubber compositions, a softer the rubber composition tends to have a better dynamic flex fatigue resistance to failure.

The results of the dynamic flex fatigue test are considered herein to be significant they are an indication of an extended fatigue life and dynamic durability of a non-black, white colored, tire white sidewall rubber based on the composition of the Sample B.

From Table 2 it can further be seen that the 300 percent modulus of the specimen of the Sample B was significantly higher than that of Comparative Sample A.

Therefore, it is considered herein that a white sidewall rubber composition based upon Sample B is stronger than that of Comparative Sample A.

From Table 2 it can additionally be seen that the weight loss per 1000 cycles for the Tabor abrasion test for Sample B was significantly less than that of Comparative Sample A.

This is considered herein to be predictive of a significant improvement of scuff resistance for a tire white sidewall rubber based on the composition of Sample B.

While certain representative embodiments and details have been shown for the purpose of illustrating the invention, it will be apparent to those skilled in this art that various changes and modifications may be made therein without departing from the spirit or scope of the invention.

What is claimed is:

1. A dual phase, non-black colored rubber composition comprised of a blend of a first elastomer phase and a second elastomer phase;
   wherein said dual phase rubber composition is comprised of, based on parts by weight per 100 parts by weight rubber (phr):
   (A) 100 phr of elastomers comprised of:
      (1) about 40 to about 90 phr of a butyl-type rubber comprised of at least one of:
         (a) butyl rubber comprised of a copolymer of isobutylene and about 0.5 to about 3 mole percent of conjugated diene comprised of isoprene,
         (b) halogenated butyl rubber selected from chlorobutyl and bromobutyl rubber,
         (c) brominated copolymer of isobutylene and para-methylstyrene,
      (2) from zero to about 30 phr of EPDM rubber, and
      (3) about 5 to about 50 phr of natural cis 1,4-polyisoprene rubber,
   (B) about 5 to about 30 phr of precipitated silica reinforcing filler;
   (C) partially exfoliated intercalated clay platelets in an amount of from about 5 to about 25 weight percent of a dispersion thereof in said natural cis 1,4-polyisoprene rubber, and
   (D) a non-black colored pigment colorant;
   wherein said first elastomer phase is comprised of a pre-blend of said butyl-type rubber(s), said optional EPDM rubber and said precipitated silica;
   wherein said second elastomer phase is a nanocomposite comprised of a pre-blend of said natural cis 1,4-polyisoprene rubber and said partially exfoliated intercalated clay platelets.

2. A pneumatic tire having an outer visible rubber sidewall of which at least a portion of said sidewall is a dual phased, non-black colored rubber composition, comprised of a blend of a first elastomer phase and a second elastomer phase;
   wherein said sidewall rubber composition is comprised of, based on parts by weight per 100 parts by weight rubber (phr):
   (A) 100 phr of elastomers comprised of:
      (1) about 40 to about 90 phr of a butyl-type rubber comprised of at least one of:
         (a) butyl rubber comprised of a copolymer of isobutylene and about 0.5 to about 3 mole percent of conjugated diene comprised of isoprene,
         (b) halogenated butyl rubber selected from chlorobutyl and bromobutyl rubber,
         (c) brominated copolymer of isobutylene and para-methylstyrene,
      (2) from zero to about 30 phr of EPDM rubber, and
      (3) about 5 to about 50 phr of natural cis 1,4-polyisoprene rubber,
   (B) about 5 to about 30 phr of precipitated silica reinforcing filler;
   (C) partially exfoliated intercalated clay platelets as a dispersion in an amount of from about 5 to about 25 weight percent of a dispersion thereof in said natural cis 1,4-polyisoprene rubber, and
   (D) a non-black colored pigment colorant;
   wherein said first elastomer phase is comprised of a pre-blend of said butyl-type rubber(s), said optional EPDM rubber and said precipitated silica;
   wherein said second elastomer phase is a nanocomposite comprised of a pre-blend of said natural cis 1,4-polyisoprene rubber and said partially exfoliated intercalated clay platelets.

3. The tire of claim 2 wherein said pre-blend of said first elastomer phase contains said EPDM rubber.

4. The tire of claim 2 wherein, for said tire sidewall rubber composition, said exfoliated clay platelets are substantially oriented in a parallel relationship to each other.

5. The tire of claim 2 wherein, for said tire sidewall rubber composition, said exfoliated clay platelets are substantially oriented in an annular direction about the axis of the tire.

6. The tire of claim 3 wherein, for said tire sidewall rubber composition, said exfoliated clay platelets substantially oriented in a parallel relationship to each other and in an annular direction about the axis of the tire.

7. The tire of claim 2 wherein said tire sidewall rubber composition wherein said sidewall rubber composition is comprised of, based on parts by weight per 100 parts by weight rubber (phr):
   (A) 100 phr of elastomers comprised of:
      (1) about 40 to about 80 phr of a butyl-type rubber comprised of at least one of:
         (a) butyl rubber comprised of a copolymer of isobutylene and about 0.5 to about 3 mole percent of conjugated diene comprised of isoprene,
         (b) halogenated butyl rubber selected from chlorobutyl and bromobutyl rubber, (c) brominated copolymer of isobutylene and para-methylstyrene,
(2) from 5 to about 30 phr of EPDM rubber, and
(3) about 10 to about 50 phr of natural cis 1,4-polyisoprene rubber,
(B) about 5 to about 30 phr of precipitated silica;
(C) partially exfoliated intercalated clay platelets as a dispersion in an amount of from about 5 to about 25 weight percent of a dispersion thereof in said natural cis 1,4-polyisoprene rubber, and
(D) a non-black colored pigment colorant.

8. The tire of claim 7 wherein said non-black colored pigment colorant is comprised of titanium dioxide.

9. The tire of claim 7 wherein said EPDM rubber is comprised of ethylene, propylene and a non-conjugated diene comprised of ethylidene norbornadiene.

10. The tire of claim 7 wherein said wherein said butyl-type rubber is comprised of a butyl rubber comprised of a copolymer of isobutylene and about 0.5 to about 3 mole percent of conjugated diene comprised of isoprene.

11. The tire of claim 7 wherein said butyl-type rubber is comprised of a halogenated butyl rubber selected from chlorobutyl and bromobutyl rubber.

12. The tire of claim 7 wherein said butyl-type rubber is comprised of a brominated copolymer of isobutylene and para-methylstyrene.

13. The tire of claim 7 wherein said exfoliated clay platelets are of a montmorillonite clay.

14. The tire of claim 2 wherein said tire sidewall rubber composition is prepared by blending pre-blended elastomer compositions comprised of, based upon parts per 100 parts of the total amount of rubber in said dual phase rubber composition (phr):
(A) a first elastomer pre-blend comprised of:
(1) elastomers comprised of:
(a) about 40 to about 90 phr of a butyl-type rubber comprised of at least one of:
(i) butyl rubber comprised of a copolymer of isobutylene and about 0.5 to about 3 mole percent of conjugated diene comprised of isoprene,
(ii) halogenated butyl rubber selected from chlorobutyl and bromobutyl rubber, and
(iii) brominated copolymer of isobutylene and para-methylstyrene, and
(b) from zero to about 30 phr of EPDM rubber, and
(2) about 5 to about 30 phr of precipitated silica reinforcing filler, with
(B) a second elastomer pre-blend as a nanocomposite comprised of:
(1) about 5 to about 50 phr of cis 1,4-polyisoprene rubber containing a dispersion therein comprised of:
(2) partially exfoliated intercalated clay platelets in an amount of about 5 to about 25 weight percent of a dispersion thereof in said natural cis 1,4-polyisoprene rubber,
to form said dual phased rubber composition comprised of a first phase comprised of said first elastomer pre-blend and a second phase comprised of said second elastomer pre-blend,
wherein at least one of said elastomer phases contains a non-black colored pigment colorant.

15. The tire of claim 14 wherein said rubber composition for said tire sidewall is prepared by blending pre-blended elastomer compositions comprised of, based upon parts per 100 parts of the total amount of rubber in said dual phase rubber composition (phr):
(A) a first elastomer pre-blend comprised of:
(1) elastomers comprised of:
(a) about 40 to about 80 phr of a butyl-type rubber comprised of at least one of:
(i) butyl rubber comprised of a copolymer of isobutylene and about 0.5 to about 3 mole percent of conjugated diene comprised of isoprene,
(ii) halogenated butyl rubber selected from chlorobutyl and bromobutyl rubber, and
(iii) brominated copolymer of isobutylene and para-methylstyrene,
(b) about 5 to about 30 phr of EPDM rubber, and
(2) about 5 to about 30 phr of precipitated silica reinforcing filler, with
(B) a second elastomer pre-blend as a nanocomposite comprised of:
(1) about 10 to about 50 phr of cis 1,4-polyisoprene rubber containing a dispersion therein comprised of:
(2) partially exfoliated intercalated clay platelets in an amount of about 5 to about 25 weight percent of a dispersion thereof in said natural cis 1,4-polyisoprene rubber,
to form said dual phased rubber composition comprised of a first phase comprised of said first elastomer pre-blend and a second phase comprised of said second elastomer pre-blend,
wherein at least one of said elastomer phases contains a non-black colored pigment colorant.

16. The tire of claim 15 wherein said EPDM is comprised of ethylene, propylene and ethylidine norbornadiene and said clay is a montmorillonite clay.

17. The tire of claim 16 wherein said non-black colored pigment colorant is comprised of titanium dioxide.

18. The tire of claim 16 wherein said butyl-type rubber is selected from:
(A) butyl rubber comprised of a copolymer of isobutylene and about 0.5 to about 3 mole percent of conjugated diene comprised of isoprene, and
(B) halogenated butyl rubber selected from chlorobutyl and bromobutyl rubber.

* * * * *